United States Patent [19]

Lebling et al.

[11] Patent Number: 6,141,007
[45] Date of Patent: *Oct. 31, 2000

[54] NEWSROOM USER INTERFACE INCLUDING MULTIPLE PANEL WORKSPACES

[75] Inventors: P. David Lebling, Concord, Mass.; Arkady P. Elterman, Avon, Conn.

[73] Assignee: Avid Technology, Inc., Tewksbury, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,873

[22] Filed: Apr. 4, 1997

[51] Int. Cl.⁷ ....................................................... G06F 3/00
[52] U.S. Cl. ............................................ 345/339; 345/346
[58] Field of Search ................................... 345/339, 326, 345/340, 342, 346, 348, 349, 352, 353, 356, 357, 327, 335; 707/500, 530, 531

[56] References Cited

U.S. PATENT DOCUMENTS

| | | | |
|---|---|---|---|
| 4,740,912 | 4/1988 | Whitaker | 345/353 |
| 4,843,468 | 6/1989 | Drewery | 348/441 |
| 5,012,334 | 4/1991 | Etra | 348/107 |
| 5,115,310 | 5/1992 | Takano et al. | 348/722 |
| 5,122,972 | 6/1992 | Richards et al. | 345/338 |
| 5,237,648 | 8/1993 | Mills et al. | 345/433 |
| 5,274,758 | 12/1993 | Beitel et al. | 345/302 |
| 5,388,197 | 2/1995 | Rayner | 345/328 |
| 5,404,316 | 4/1995 | Klingler et al. | 345/328 |
| 5,404,440 | 4/1995 | Asahi | 345/335 |
| 5,426,513 | 6/1995 | Scorse et al. | 358/433 |
| 5,442,744 | 8/1995 | Piech et al. | 345/302 |
| 5,442,745 | 8/1995 | Hirose | 345/335 |
| 5,493,568 | 2/1996 | Sampat et al. | 370/261 |
| 5,513,306 | 4/1996 | Mills et al. | 707/530 |
| 5,530,852 | 6/1996 | Meske, Jr. et al. | 709/206 |
| 5,613,057 | 3/1997 | Caravel | 345/302 |
| 5,623,308 | 4/1997 | Civanlar et al. | 348/392 |

(List continued on next page.)

FOREIGN PATENT DOCUMENTS

WO 94/11806   5/1994   WIPO .

OTHER PUBLICATIONS

Netscape Navigator for OS/2 Warp, Version 2.02, screen prints of Netscape Mail, 3 pages, 1994–1997.

(List continued on next page.)

*Primary Examiner*—Crescelle N. dela Torre
*Attorney, Agent, or Firm*—Wolf, Greenfield & Sacks, P.C.

[57] ABSTRACT

A newsroom computer graphical user interface and method for displaying a workspace including non-overlapping, cooperating panels. A first of the panels displays a queue of news stories from a selected data file. A second panel displays the text of a news story selected from the queue. The workspace is displayed in a main application window on a display screen of a computer system that is coupled to a network. The first and second panels may share a common moveable border. A third panel may also be displayed that includes a directory tree of data files from which the selected data file is selected. The second panel may include subpanels such as one that displays the text of the selected news story; a second that displays information about the news story; and a third that displays machine code for manipulating machines, such as a video playback device, during a broadcast. The machine code may be anchored to a predetermined point in the text displayed in the first sub-panel. The predetermined point is a location in the text at which the machines are controlled in response to the machine code.

48 Claims, 9 Drawing Sheets

U.S. PATENT DOCUMENTS

| | | | |
|---|---|---|---|
| 5,623,589 | 4/1997 | Needham et al. | 345/356 |
| 5,659,793 | 8/1997 | Escobar et al. | 345/302 |
| 5,664,216 | 9/1997 | Blumenau | 345/302 |
| 5,682,326 | 10/1997 | Klingler et al. | 345/302 |
| 5,689,669 | 11/1997 | Lynch et al. | 345/355 |
| 5,706,290 | 1/1998 | Shaw et al. | 370/465 |
| 5,708,960 | 1/1998 | Kamisaka et al. | 455/3.2 |
| 5,740,549 | 4/1998 | Reilly et al. | 705/14 |
| 5,801,685 | 9/1998 | Miller et al. | 345/302 |
| 5,815,663 | 9/1998 | Uomini | 709/219 |
| 5,815,830 | 9/1998 | Anthony | 707/6 |
| 5,819,271 | 10/1998 | Mahoney et al. | 707/9 |
| 5,835,087 | 11/1998 | Herz et al. | 345/327 |
| 5,852,435 | 12/1998 | Vigneaux et al. | 345/302 |
| 5,889,950 | 3/1999 | Kuzma | 709/218 |

OTHER PUBLICATIONS

Burghardt J., "Das Sony–News–System," vol. 50, No. 11, Nov. 1996, pp. 641–642, 644–646.

B. Wheeler, "A Closer Look At The AvidNews Client," Broadcast Update, vol. 2, No. 1, Jan. 1997, pp. 6–8.

Broadcast Update, vol. 1, No. 1, Oct. 1996, pp. 1–12.

Rakesh Mohan, "Text–Based Search For TV News Stories," Nov. 1996, Proceedings of the SPIE, vol. 2916, pp. 2–13.

England et al., "Rave: Real–Time Services For The Web," May 1996, 5th International World Wide Web Conference, vol. 28, No. 7–11, Computer Networks and ISDN Systems, pp. 1547–1558.

Özsu et al, "An Object–Oriented Multimedia Database System For A News–On–Demandapplication," 1995, Multimedia Systems, vol. 3, No. 5–6, pp. 182–203.

Charles L. Compton et al., "Internet CNN NEWSROOM: A Digital Video News Magazine Library," May 1995, pp. 296–301.

Richard Bentley, et al., "Supporting Collaborative Information Sharing with the World Wide Web: The BSCW Shared Workspace System," IC3W, Dec. 1995.

Barbará, Daniel, et al., "The Gold Mailer," Proceedings of the Interntinoal Conference of Data Engineering, Vienna, Apr. 1993, pp. 92–99.

"É facile INTERNET," 1997, Jackson Libri, Bress, Italy, pp. 78–79.

Groeger, H., "Der Digitale Newsroom," Frenesh unde Kinotechnik, vol. 50, No. 11, Nov. 1996, pp. 654–656.

| SLUG | MOVED |
|---|---|
| EUREKA AND ... | JULY, 12... |
| ROCKER - DEAT... | JULY, 12... |
| SOUTHERN S... | JULY, 12... |
| BERTHA, UP... | JULY, 12... |
| INDEX,0516... | JULY, 12... |
| FRESNO AND... | JULY, 12... |
| NORTHERN A.... | JULY, 12... |
| YUGOSLAVIA, 0528 | JULY, 12... |
| READ ALL A.... | JULY, 12... |
| EUREKA AND... | JULY, 12... |
| ROCKER DEAT... | JULY, 12... |

YUGOSLAVIA 0528     PM-AP
FRIDAY, July 12, 08:56     02:49

INVESTIGATORS SAY EVIDENCE INDICATES MUSLIMS LINED UP, SHOT: WITH PM-YUGOSLAVIA- US GENERALS, BJT AP PHOTO PLANNED

BY TERRENCE PETY
ASSOCIATED PRESS WRITER

CERSKA, BOSNIA-HERZOGOVINA (AP)-EXPERTS UN-EARTHED

Fig. 7A

| PAGE | SLUG | FORMAT | WRITER | EST. RUN | STATUS |
|---|---|---|---|---|---|
| A01... | NEWS OPEN | VO | ML | 0:25. | |
| A02... | HURRICANE LOIS | VO | DC | 0:36 | |

NEWSROOM USER INTERFACE INCLUDING MULTIPLE PANEL WORKSPACES

FIELD OF THE INVENTION

This invention relates to computer graphical user interfaces used to access news stories stored electronically on a network server.

BACKGROUND OF THE INVENTION

The television broadcast news industry has evolved from communicating information within the newsroom with paper and teletype formats to using computer-based information transfer systems that transfer electronic documents. Currently, specialized computer systems assist in news production, promotion, and distribution of electronic documents to allow newsroom personnel to perform their functions more efficiently. These specialized computer systems can also store a wide variety of news media such as text, images, and broadcast video for distribution within the newsroom and for transmission to external destinations.

In a busy and high pressure newsroom environment, it can be critical that the producers, directors, anchor people and technical staff have quick and easy access to the news stories which are to be presented on a typical broadcast, as well as the information regarding the structure of the broadcast and the lineup and timing of the broadcast. In the past, while this information was available on a computer network, the conventional display of such information tended to be cluttered, and difficult to access and manage. Typically, information regarding the directory of data files would be in one window on the display screen, information regarding a queue of the stories to be run would be in a separate window and the actual text for the stories would be in a third window. Switching back and forth between windows in order to coordinate the broadcast and edit fields within the windows in these systems could be slow, was generally not intuitive, and could result in broadcast errors.

SUMMARY OF THE INVENTION

One aspect of the invention features a newsroom computer graphical user interface. The newsroom graphical user interface comprises means for displaying at least one workspace in a main application window on a display screen of a computer system, the computer system being coupled to a network and having a processor. The newsroom graphical user interface further comprises means for storing a plurality of news stories in a plurality of files, means for delivering selected visual representations of the files from the means for storing to the display screen under control of the processor and user-controlled input means for controlling the means for storing and the means for delivering. The workspace comprises a plurality of non-overlapping, cooperating panels, a first of the panels displaying a queue of the news stories of a selected one of the data files and a second of the panels displaying text of a news story selected in the first panel. The plurality of panels share a common moveable border and a third panel is displayed which displays a directory tree of the data files. The workspace is capable of toggling between displaying all of the first, second and third panels and displaying one of the first, second and third panels. A tool bar of the main application window comprises a means for sending messages to and receiving messages from other users on the network.

The first panel comprises a plurality of rows, each containing information about each of the plurality of news stories, and a plurality of columns, each containing a different field of the information about each news story. The second panel comprises at least one sub-panel, a first of which displays the text of the selected news story. A second sub-panel displays the information about the story selected in the first panel, and a third sub-panel displays machine code for controlling machines during a broadcast. The machine code is anchored to a predetermined point in the text of the first sub-panel, the predetermined point being the location in the text where the machines are controlled in response to the machine code.

In another embodiment of the invention, a computer implemented method for use in a newsroom is disclosed, comprising displaying at least one workspace window on a display screen of a computer system, the computer system being coupled to a network and including a processor, the display screen being coupled to the processor, storing data files, each containing a plurality of news stories, delivering visual representations of the data files from the storing means to the display screen, and receiving a first input signal from the input means, which indicates a selection of one of the data files. The method comprises displaying, in a first panel of the workspace window, a queue of the plurality of news stories contained in the selected data file in response to the step of receiving the first input, receiving a second input signal from the input means, which indicates a selection of one of the plurality of stories contained in the selected data file, and displaying, in a second panel of the workspace window, text of the selected story in response to the step of receiving the second input.

The method comprises displaying, in the second panel, information about the selected story and displaying, in a third panel of the workspace, a directory tree of the data files. The method further comprises receiving a third input from the input means, which comprises machine code instructions for manipulating machines during a broadcast, and in response to the third input, displaying the machine code in the third panel.

DETAILED DESCRIPTION

A preferred embodiment according to one aspect of the invention includes a computer graphical user interface for viewing and editing news stories. The user interface can be used in connection with a system described in the U.S. patent application entitled "NEWS STORY MARKUP LANGUAGE AND SYSTEM AND PROCESS FOR EDITING AND PROCESSING DOCUMENTS" by David Micheal Parks, U.S. Ser. No. 08/832,866 filed on even date herewith, which describes a news story markup language used for generating news story documents. The user interface can also be used in connection with a system described in the U.S. patent application entitled "A DIGITAL MULTIMEDIA EDITING AND DATA MANAGEMENT SYSTEM" by David S. W. Paigen, U.S. Ser. No. 08/832,872 filed on even date herewith, which can act as a news story server that provides news story markup language documents to clients, other servers, viewers, and editors that receive and process such news story markup language documents, and in a system described in the U.S. patent application entitled "A MULTIMEDIA SYSTEM WITH IMPROVED DATA MANAGEMENT MECHANISMS" by Jason Loveman, Mark Allen, Ron White and Charles Haynes, U.S. Ser. No. 08/852,868 filed on even date herewith, which simultaneously encodes multiple versions of a multimedia data signal, and provides substantially simultaneous access and storage of the multiple versions with a correspondence between the multiple versions being generated during storage. The above patent applications are herein incorporated by reference.

Figure 1:
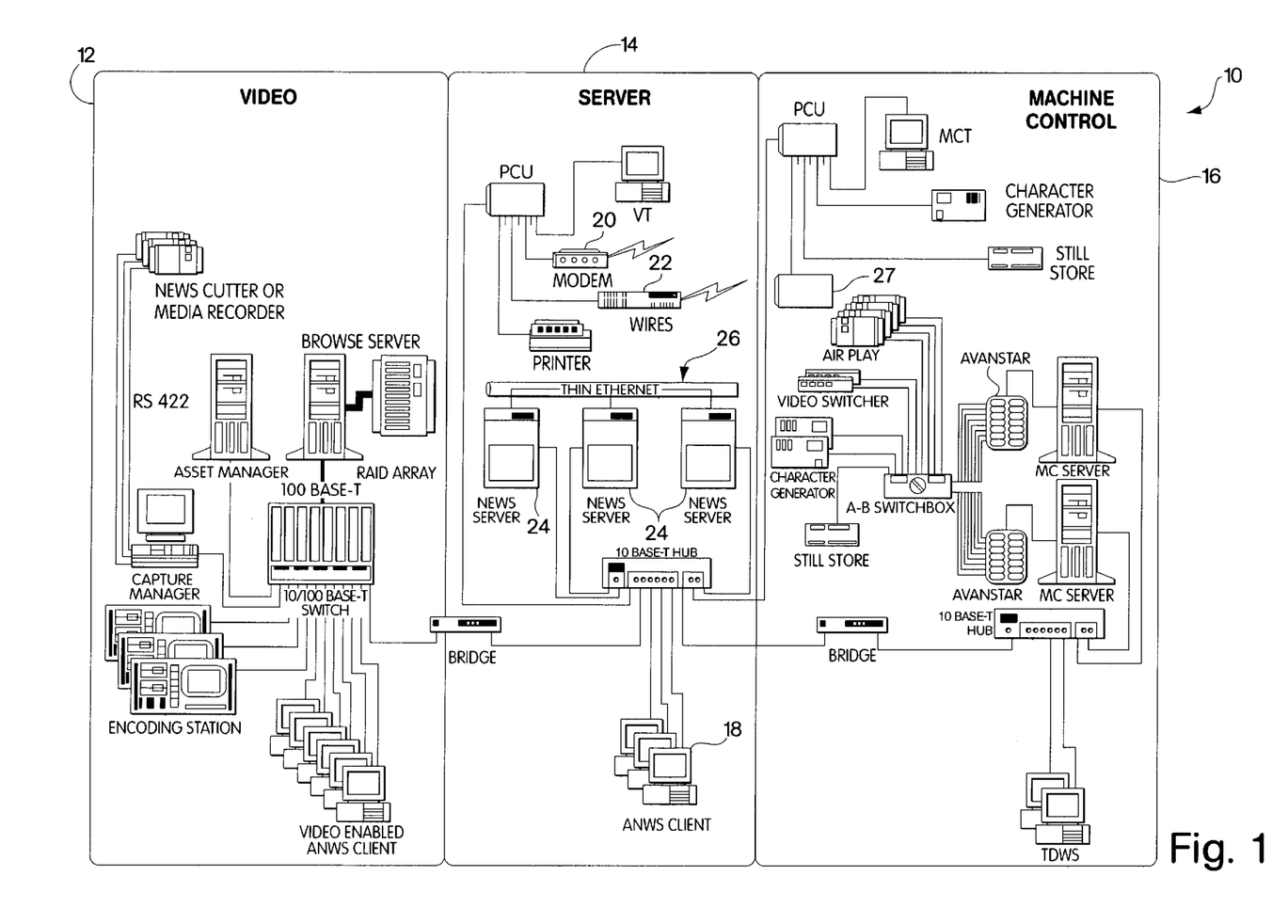
FIG. 1 is a schematic overview diagram of the client/server network which is used in conjunction with the present invention.

A newsroom computer network 10, with which embodiments according to aspects of the present invention may be used, is shown in FIG. 1. The network includes a video portion 12, a server portion 14 and a machine control portion 16. The graphical user interface according to the present invention is typically presented to a user on display screens of clients 18 of the server portion 14. News stories are entered through the clients 18 or through other means such as a modem 20 or a wire service interface 22, which receive data over phone lines or news wire services, respectively. The stories are stored on servers 24 and are accessible to the clients 18 for editing and configuring the broadcast. Machine code entered into portions of the news story is used to control the operation of the video portion 12 and the machine control portion 16 during the course of a broadcast.

The clients 18 and the servers 24 may be general-purpose computer systems, which are programmable using a high-level computer programming language. The computer system may also be implemented using specially programmed, special purpose hardware. The clients 18 and servers 24 include processors which are typically commercially available processors, such as the Pentium™ microprocessor from the Intel Corporation, PowerPC™ microprocessor, SPARC processor, PA-RISC™ processor or 68000 series microprocessor. Of course, many other processors are also available. Such processors usually execute an operating system which may be, for example, the MS-DOS, Windows 95™, or Windows NT™ operating systems from the Microsoft Corporation, the System 7™ operating system from Apple Computer, the Solaris™ operating system from Sun Microsystems, the NetWare™ or IntranetWare™ operating systems from Novell, or UNIX operating systems available from many other different vendors.

The clients 18 are coupled to the servers 24 through a communication network 26. The communication network 26 may be an Ethernet-based network or other type of local or wide area network (LAN or WAN), a point-to-point network provided by telephone services, or another type of communication network. Information consumers and providers such as the clients 18 and the servers 24 communicate through the network 26 to exchange information. The servers 24 may store news story documents on a storage device located within the servers 24. The servers may also provide these news story documents to one or more of the clients 18 in response to a request generated by a client through the network 26. Similarly, news story documents may be created, edited, viewed, or converted on the client 18 and server 24 systems.

It should be understood that the invention is not limited to a particular computer system platform, processor, operating system, programming language or network.

Main Application Window

Figure 2:
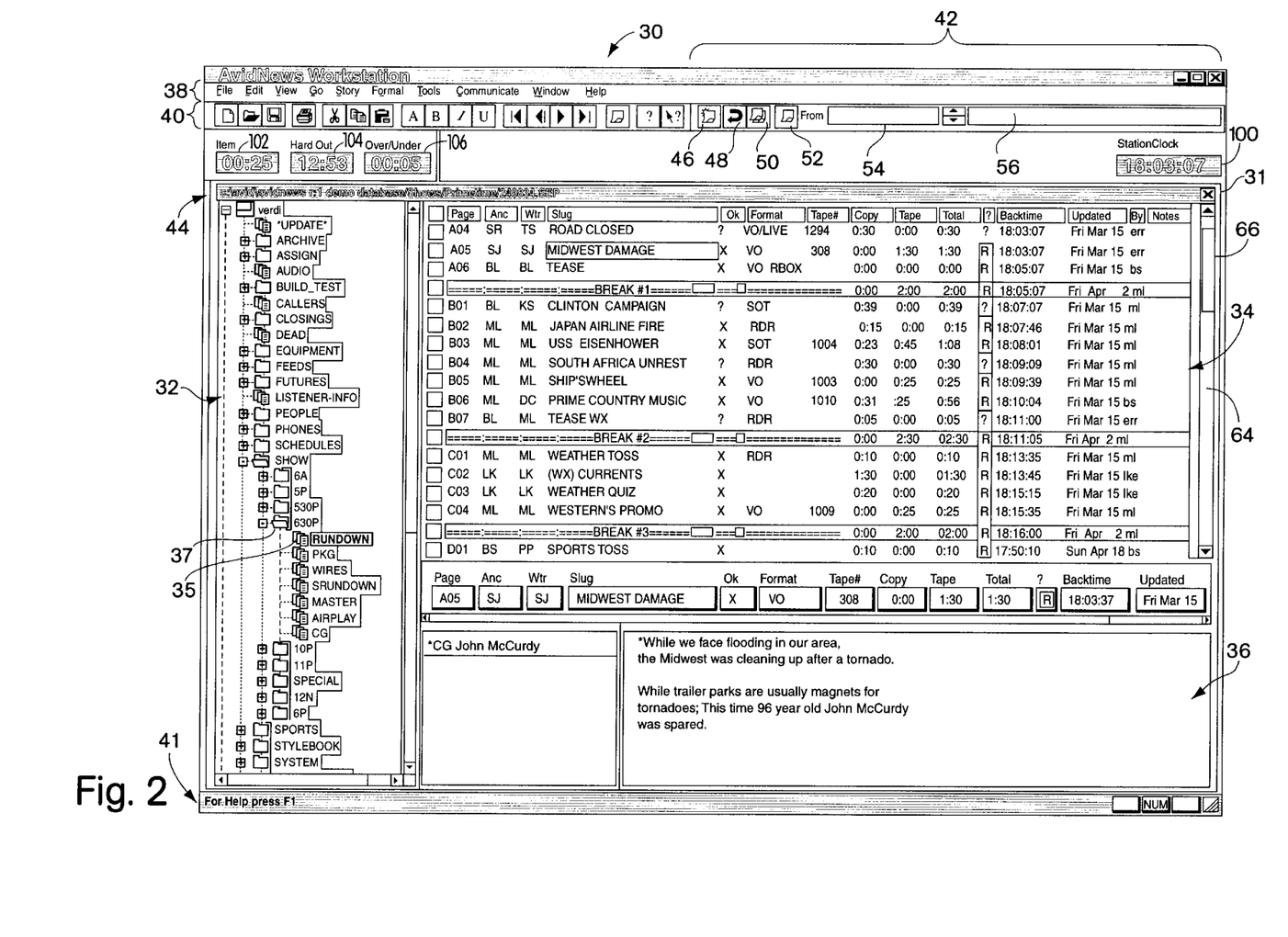
FIG. 2 shows one embodiment of the main application window of the graphical user interface for use with the network of FIG. 1, showing illustrative direction, queue, and story information.

FIG. 2 shows an embodiment of a main application window 30, which can be presented to the user on a monitor of one of the clients 18. The main application window 30 includes a workspace 31, which displays a directory panel 32, a queue panel 34 and a story panel 36. The main application window 30 also includes a menu bar 38 and a tool bar 40. As will be discussed in greater detail below, the directory panel 32 displays a directory tree of data files included in a selected database stored on the servers 24. A directory specification bar 44 of the workspace 31 indicates which directory has been selected for display. The queue panel 34 displays a queue of stories which are included in the data file selected in directory panel 32. The story panel 36 displays the text of a story selected in the queue panel 34. When a user is working in one of the directory panel 32, queue panel 34 or story panel 36, that panel is said to be in "focus." Focus may be switched from one panel to another in order to enable the user to work in the different panels.

In the main application window 30 shown in FIG. 2, the queue entitled "RUNDOWN" 35 has been selected from a folder named "630P" 37 in the directory panel 32, by the user placing the cursor over the queue name and single clicking with a mouse or other pointing device on the queue name while the directory panel is in focus. The user can then open the "RUNDOWN" queue by double-clicking on the queue name. Opening a directory in the directory panel 32 causes the queue for that file being displayed in the queue panel 34 and the focus to switch to the queue panel 34. The queue panel displays the list of stories for a particular broadcast, including format and timing information for each story. The story panel 36 displays text for the particular stories, such as the text from the story "MIDWEST DAMAGE," which is shown as selected in the queue panel 34. The text which is displayed in the story panel 36 may also be sent, via the network 26, to a teleprompter 27 to be read by the news anchorperson during the broadcast.

The workspace 31 may be presented in several different, user-selectable layouts. FIGS. 3A–6B show different layouts of the main application window. The layouts of the main application window may be selected using the View/Layout command from the menu bar. Four different layouts in which the workspace can be configured are shown in FIGS. 3A, 4A, 5A and 6A. The main application window is also capable of operating in a "drill down" or "zoomed-in" mode, in which one panel is maximized to occupy the entire client area of the workspace window. These configurations are shown in FIGS. 3B, 4B, 5B and 6B. This mode is selected from a tool bar or an object menu (described below) in each panel.

Figure 3A:
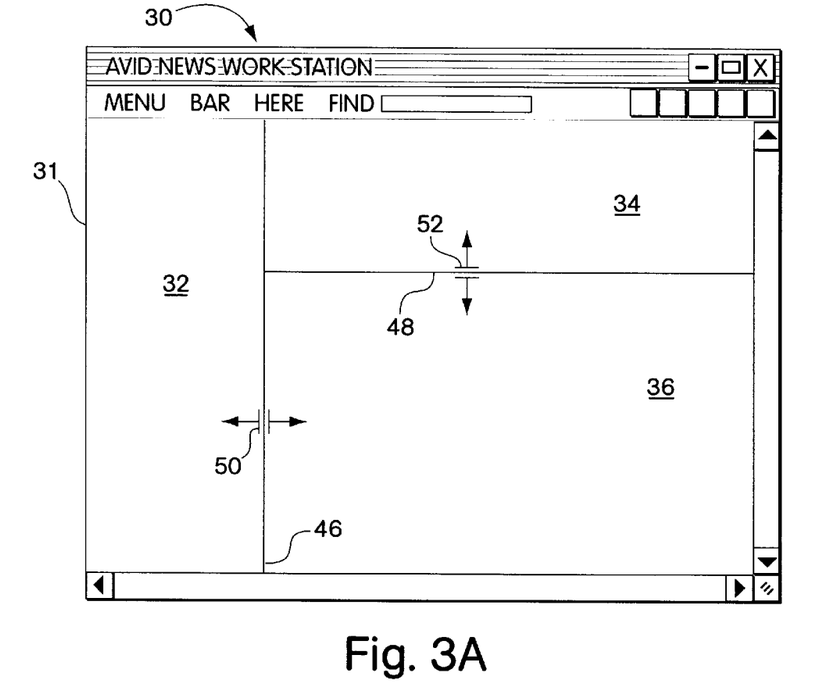
FIGS. 3A and 3B show full-screen layouts of the main application window of the graphical user interface of FIG. 2.
Figure 3B:
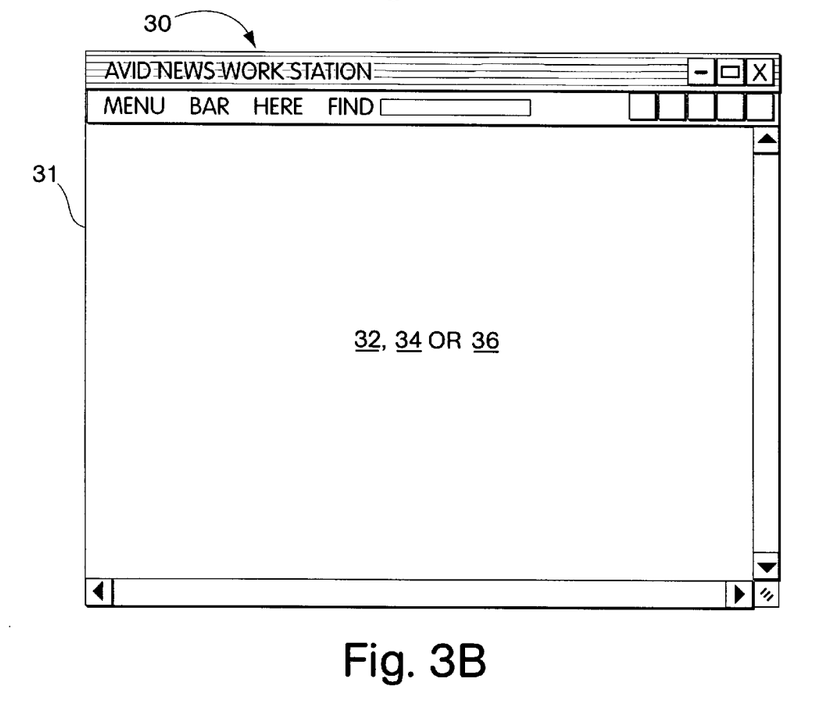
Figure 4A:
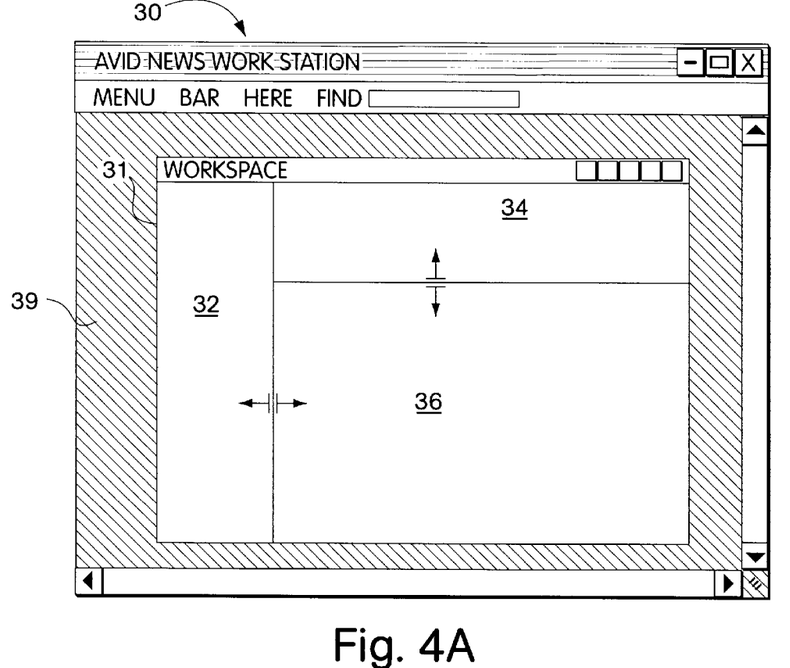
FIGS. 4A and 4B show sized layouts of the main application window of the graphical user interface of FIG. 2.
Figure 4B:
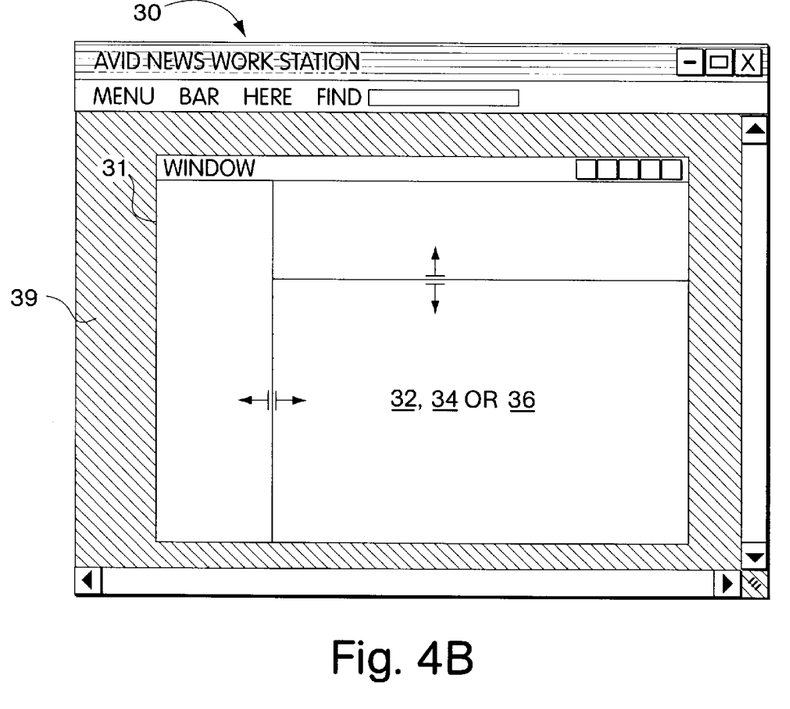
Figure 5A:
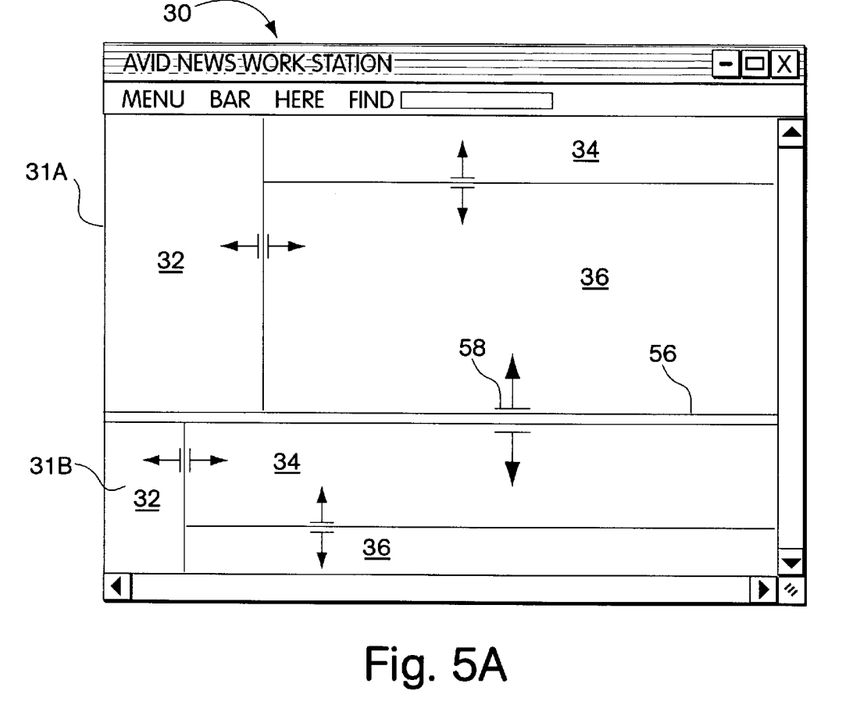
FIGS. 5A and 5B show multiple workspace, sized layouts of the main application window of the graphical user interface of FIG. 2.
Figure 5B:
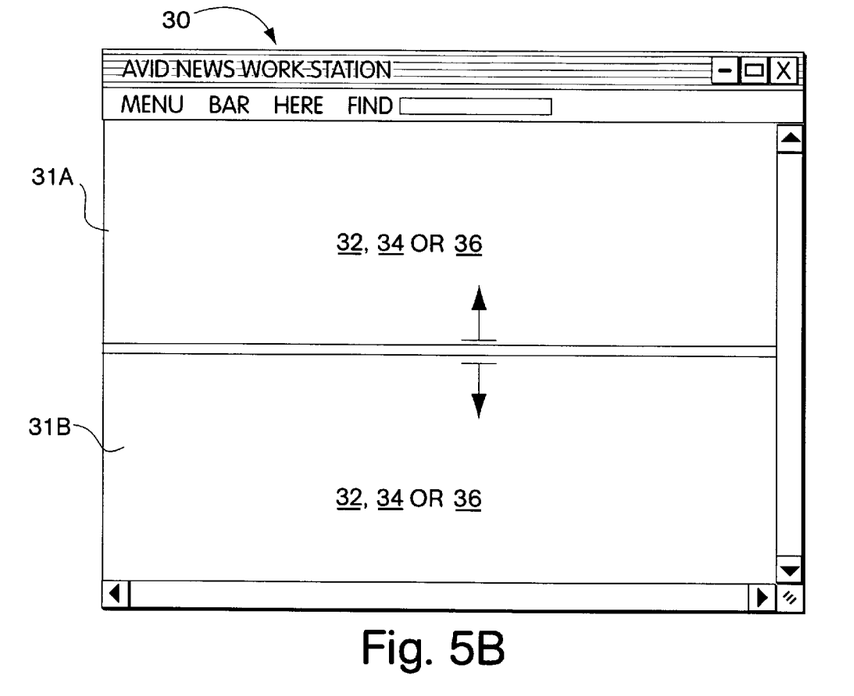
Figure 6A:
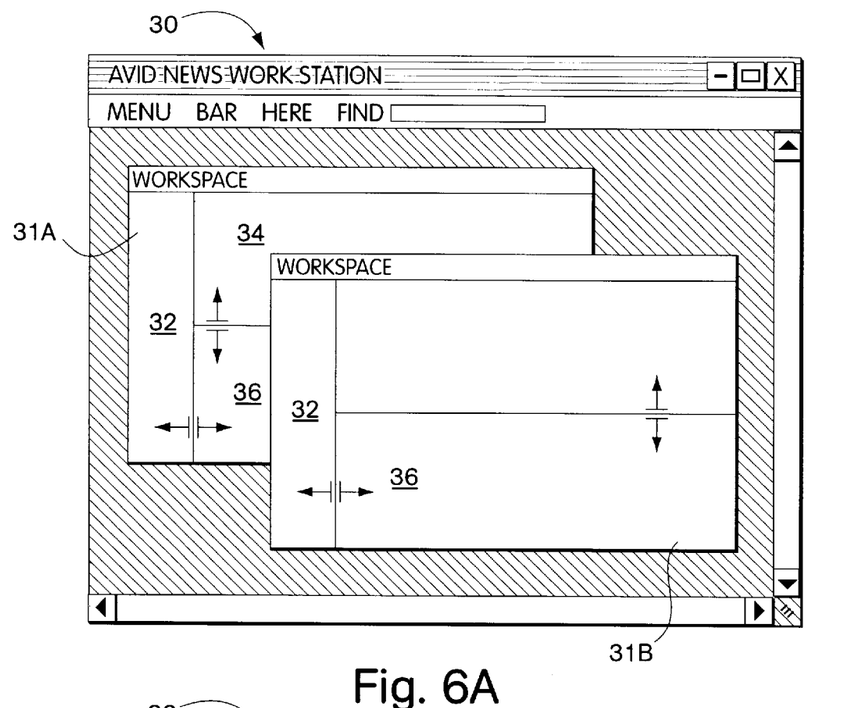
FIGS. 6A and 6B show multiple workspace, sized layouts of the main application window of the graphical user interface of FIG. 2.
Figure 6B:
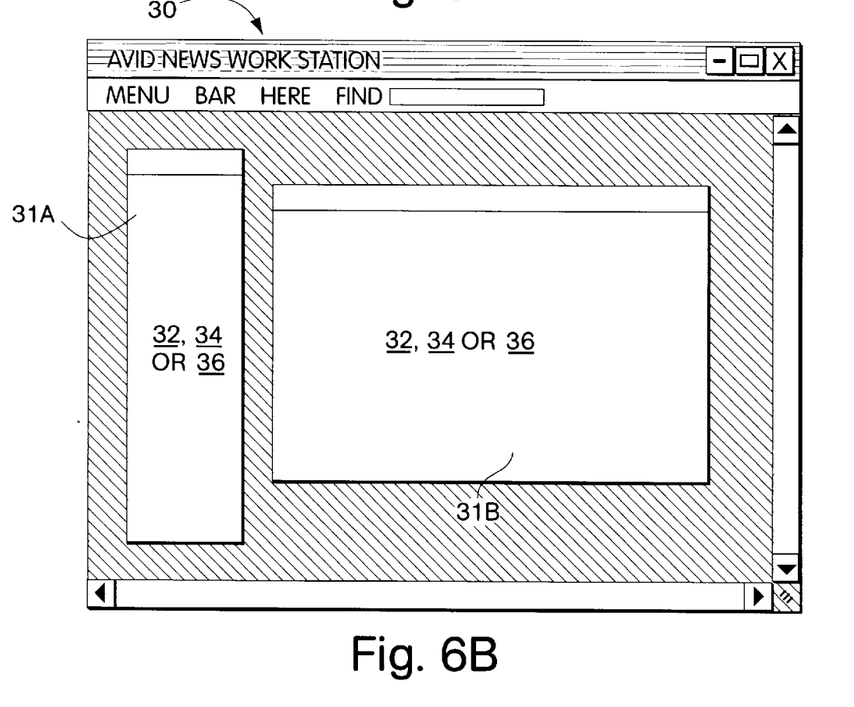

A single workspace 31 is shown in FIG. 3A. In this configuration, the workspace, including the directory, queue and story panels 32, 34 and 36, occupies the full main application window 30. FIG. 3B shows one of the directory, queue or story panels occupying the entire main application window 30 in the "drill down" mode. FIG. 4A shows a single workspace 31 occupying a window over a background 39 within the main application window 30. The single workspace includes directory panel 32, queue panel 34 and story panel 36. FIG. 4B shows the workspace 31 displaying one of the directory, queue or story panel occupying the entire window of the workspace in the "drill down" mode. FIG. 5A shows two workspaces 31A and 31B in a non-overlapping configuration occupying the entire main application window 30. FIG. 5B shows two workspaces 31A and 31B in the "drill down" mode, each showing one of the directory, queue or story panels in each of the two workspaces. FIG. 6A shows two workspaces 31A and 31B configured in a tiled window configuration, each window displaying the directory panel 32, queue panel 34 and story panel 36. FIG. 6B shows the workspaces 31A and 31B in the "drill down" mode, each window displaying either the directory panel 32, queue panel 34 or story panel 36.

While FIGS. 5A–6B show two workspaces open within main application window 30, the number of workspaces which may be opened within main application window 30 is only limited by the available memory of the client 18.

As shown in FIG. 3A, when a single workspace occupies an entire screen, the directory panel 32 shares a common border 46 with the queue panel 34 and the story panel 36. The queue panel 34 also shares a common border 48 with the story panel 36. The borders 46 and 48 are formed by conventional splitter bars, and can be moved in directions indicated by arrows 50 and 52, respectively, to vary the size of each of panels 32, 34, and 36. These splitter bars are moved using the conventional "drag and drop" operation by left clicking on the border with a mouse and dragging the border to the desired location and releasing the mouse button, thereby "dragging" the border to the desired location and "dropping" it to resize the respective panels. The borders of the workspaces shown in FIGS. 4A, 5A, and 6A can be resized in a similar manner as the panels of FIG. 3A.

The main application window 30 is the window in which most of the user's work will be done. It appears directly after the user has logged in. The main application contains many other windows, including, but not limited to, workspace windows, which in turn, may contain directory, queue, and story panels. Other windows contained in the main application window 30 are control bars, such as menu bar 38 and tool bar 40. The tool bar 40 of the main application window 30 can be customized. The tool bar 40, by default, is docked on top of the main frame, but can also be moved anywhere by the user or be free floating, i.e., the tool bar can place itself in an optimum position given the arrangement of panels in the window. The tool bar buttons may be customized and manipulated in the same way as button bars used in conventional window-based applications.

Tool bar 40 includes a messaging portion 42, which allows users to send messages between clients 18. The messaging portion 42 includes "NEW" button 46, "RIPLY" button 48. "HISTORY" button 50, "SEND" button 52, "TO/FROM" text window 54 and message text window 56. The "NEW" button 46 initiates the sending of a new message. The "REPLY" button 48 allows the user to reply to a message sent by another user. The "HISTORY" button 50 displays a history of messages sent and replies received by the user, and the "SEND" button 52 enables the user to send a message to another user. When the user is sending a message, "TO/FROM" text window 54 is used as a "TO" window, where the sender indicates to whom the message is being sent. When a message is received by a user, text window 54 becomes a "FROM" window, where the name of the sender is displayed. The message, which is limited to 256 characters, is typed into the message text window 56. Once the message is typed into the message text window 56, the user mouse-clicks on the "SEND" button 52 to send the message to the recipient via the network 26.

This messaging portion 42 allows short messages to be sent quickly between the clients 18 without requiring the use of a separate e-mail program which takes up space within the main application window 30.

While the preferred layout is with the directory panel 32 on the left side of the screen, the queue panel 34 on the upper right side, and the story panel 36 on the lower right side, such as is shown in FIG. 2, each workspace can be viewed in one of the layouts shown in FIGS. 3A, 4A, 5A, and 6A displaying the directory, queue and story panels at different locations relative to each other.

The main application window 30 of the present invention is capable of operating in a refresh mode which enables the separate workspaces to behave as non-overlapping, cooperating windows. Switching to the refresh mode is similar to evoking the tile command in a conventional window-based application. In refresh mode, there is a main frame splitter bar which divides the main application window into the workspaces. Resizing workspaces is done by dragging the splitter bar. The splitter bars of the present invention operate in the same way as conventional windows-based applications. The layout shown in FIG. 5A is operating in the refresh mode. The splitter bar 56 between the workspaces 31A and 31B may be moved in order to resize one of the workspaces 31A and 31B in the direction shown by the arrows 58. If the splitter bar 56 were to be dragged toward the top of the window, in order to make the workspace 31A smaller, the workspace 31B would be made larger in order to compensate for the space unoccupied when the workspace 31A is resized.

The dragging of the splitter bars enables one or more of the panels to be effectively closed, thereby allowing the open panels to occupy the entire client area of the workspace window. For example, in FIG. 3A, the border 46 can be dragged to the extreme left of the window, thereby effectively removing the directory panel 32 from the workspace and allowing the queue panel 34 and the story panel 36 to occupy the entire workspace. The directory panel 32 is not actually closed, but is simply removed from view within the workspace.

Directory Panel

Referring back to FIG. 2, a discussion of the directory panel 32 follows. The directory panel 32 displays a directory tree of a database which is selected by the user. The main purpose of the directory panel 32 is to provide a navigational aid to the user for browsing the news and local databases. From the directory panel 32, the user may browse the structure of the database and may select one of the files included in the database and thereby cause the stories included within the file to be displayed in the queue panel 34. When a queue item or data file is selected and opened from the directory tree, the queue panel 34 is updated automatically, put in focus, and made to show the contents of the data file selected.

The user may select an item in the directory panel 32 by clicking on it with the left mouse button, or by using the client's 18 arrow keys to navigate to the desired item. Selecting an item within the directory panel has no effect on the other windows or panels. The user may open selected items in a new workspace by double clicking with the left mouse button on the item or by selecting the item and pressing the "enter" or right arrow key. Pressing the right arrow key while a queue item is selected also moves the focus to queue panel 34. In the example shown in FIG. 2, the queue 35, which is stored in the file 37, has been opened. The contents of the queue 35 are then displayed in the queue panel 34.

When in the non-drill-down mode, i.e., when the workspace is shown as a multi-panel workspace, the directory panel is sized by dragging the splitter bars between the panels of the workspace. As described above, in a multi-panel workspace window, the directory panel cannot be closed separately, but can be closed within the workspace by dragging the slitter bar 46 of FIG. 3A, for example all the way to the left of the workspace. This causes the directory panel 32 to not be displayed within the workspace 31, while the queue panel 34 and the story panel 36 occupy the entire workspace. In the drill down mode, the directory panel occupies the entire workspace.

Queue Panel

Selecting a queue in the directory panel 32 and opening that queue causes the queue to be read from the database on the host system. The visible contents of the queue are downloaded and displayed within the queue panel 34 of the workspace. For example, when the queue entitled "RUN-DOWN" 35 is selected and opened in the directory panel 32, the contents of the queue are displayed in the queue panel 34, as shown in FIG. 2. The queue panel 32 allows the user to browse a list of stories stored within the selected data file and to quickly see and compare some summary information about each story in the list. The summary information which is available is discussed in more detail below. From the list, the user can also select and open one of the stories contained in the queue. Opening a story causes the text of the story to be displayed in the story panel 36.

The queue panel 34 is either shown as one of several panels of a workspace window, as shown in FIG. 2, or by itself in the drill down mode. Using the queue panel 34, the user may browse the queue to see a template of summary information for a list of stories, or may open one of the stories for editing or viewing. There are several appearances that queue panel 32 may assume aside from that shown in FIG. 2, depending on who is viewing the queue and what information about the stories is most important to that user. These views are customizable, so that a user can select to view only information about the stories that is important to the user. Examples of these views are shown in FIG. 7A–7C.

Figure 7A:
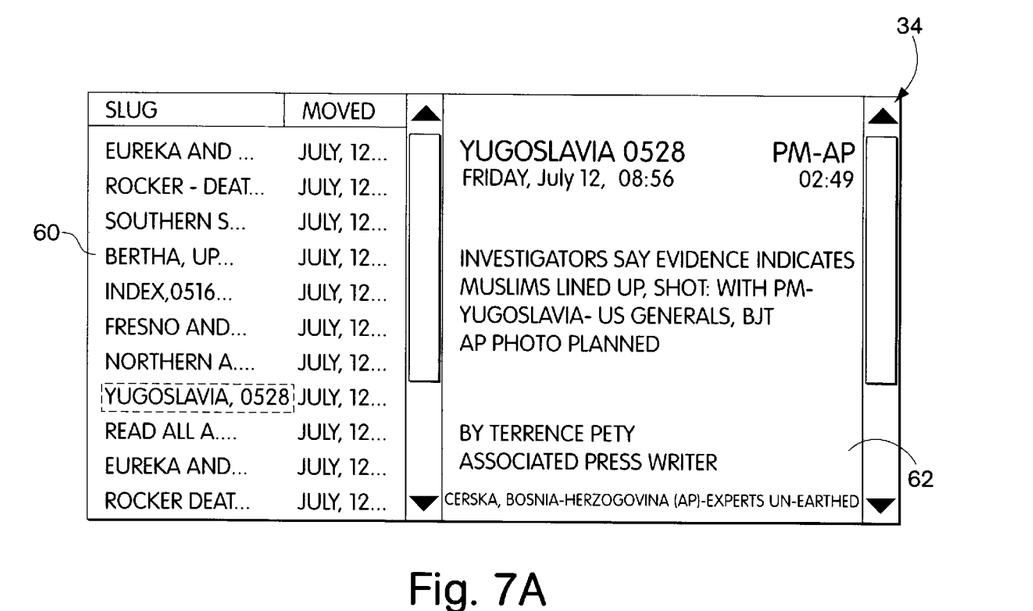
FIG. 7A shows a browser mode of the queue panel of the main application window of the graphical user interface of FIG. 2.
Figure 7B:
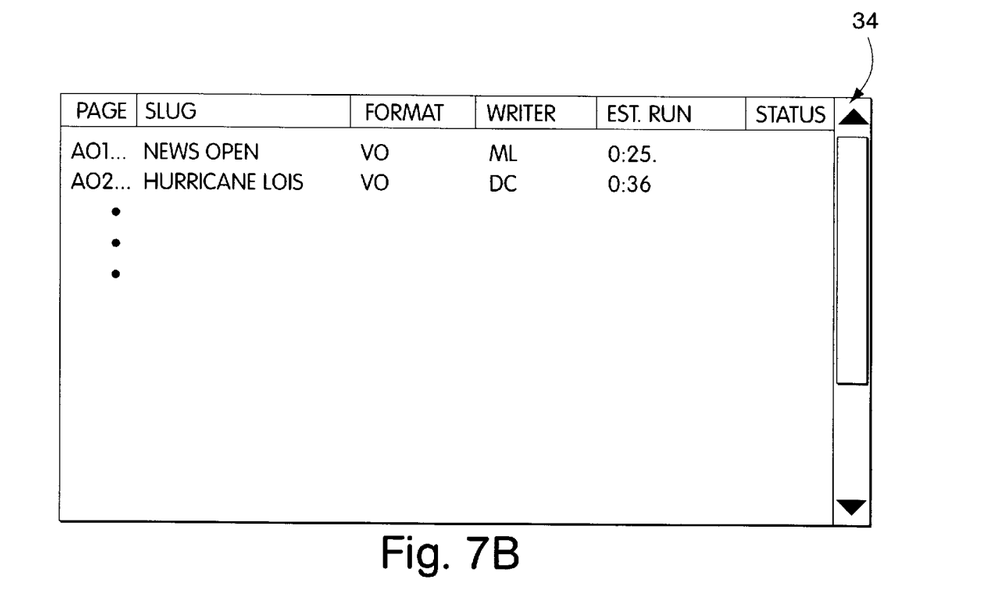
FIG. 7B shows a timing mode of the queue panel of the main application window of the graphical user interface of FIG. 2.
Figure 7C:
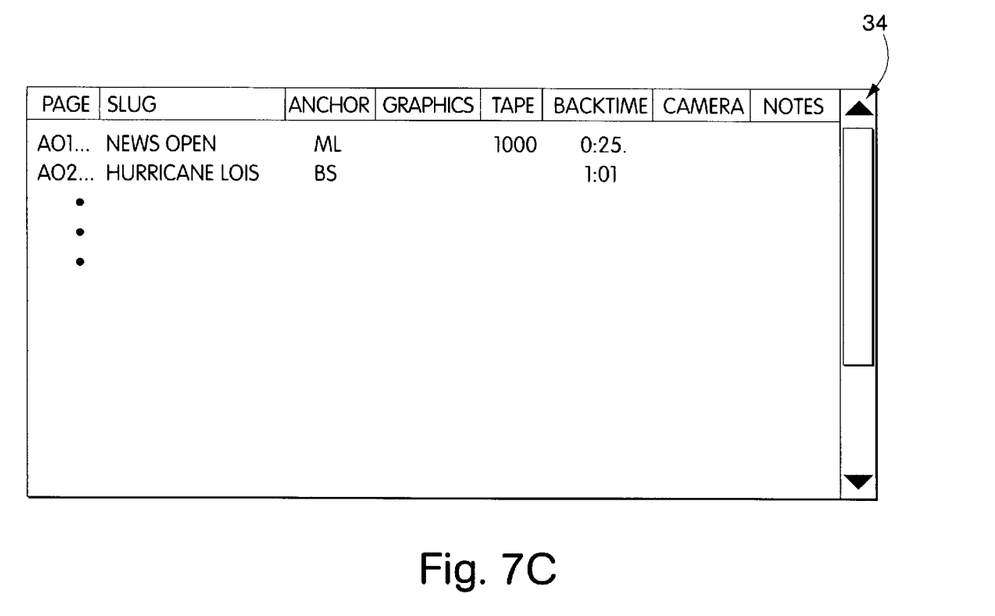
FIG. 7C shows an on-air mode of the main application window of the graphical user interface of FIG. 2.

FIG. 7A, shows a "wire browsing" mode of the queue panel 32. As users input stories or as they are received through the modem or news wire service receiver, the queue may be automatically updated to reflect the newly received stories. In the wire browsing mode, the listing of the stories in the queue is presented in a window 60 on the left side of the panel and the content of a selected story is presented in a window 62 on the right side of the panel. FIG. 7B shows a timing mode of the queue panel 31. In the timing mode, the queue panel 34 shows a view of the timing information of the particular stories in the queue. This view may be used by the producer of the news broadcast. FIG. 7C shows an on-air mode of the queue panel 34. In the on-air mode, the queue panel 34 shows a view which may be used by the director of the news broadcast, which shows information of the stories, including the run time of a series of stories as well as other information which the director may need.

Regardless of which layout is chosen for the queue panel 34, the display of the queue panel 34 is similar to a conventional spreadsheet layout, and is manipulated with key strokes and commands similar to those used by a conventional spreadsheet. The queue panel 34 consists of several rows which include the names of the stories within the queue and information about the stories. Columns within the queue panel 34 indicate different fields of information included about each story. The column headers contain the field names. Referring to FIG. 2, a description of each of the fields of information will be given. Beginning from the left side of the panel, the fields are as follows:

Page: indicates where within the broadcast each story is located

Anc: the initials of the anchor person who will be presenting the story

Wtr: the initials of the person who wrote the story

Slug: a short title of the story

OK: indicates an approval status of the story

Format: indicates the format of the story, such as a voice over, a live report, etc.

Tape#: indicates the number of the video tape associated with the story

Copy: indicates the length of time of text read by the anchor person

Tape: indicates the length of video tape run during the story

Total: indicates the total time of the story

?: indicates a ready status of the story

Backtime: indicates the elapsed time of the broadcast (described below)

Updated: indicates the date that the story was last updated

By: indicates the initials of the person who updated the story last

Notes: a general area for any notes which accompany the story

Each story in the queue contains the appropriate information for each field. This enables users to quickly see a rundown of the broadcast and to compare information between stories.

The user can navigate between stories by using the up arrow and down arrow keys and from field to field within a story using the left arrow and right arrow keys. Double clicking the left button mouse on a field opens this story within the story panel 36. Once the story is opened, focus is switched to the story panel 36, and the story may be edited within story panel 36.

The order and appearance of the fields in a queue within a field may be changed. When a queue of a broadcast is initially displayed in the queue panel 34, the queue is displayed in a "sorted" mode according to one of the fields in the queue. Typically the queue is sorted based on the order of the stories in the broadcast. In this case, the stories are sorted according the "Page" field in the queue. If stories within the queue must be reordered, due to time constraints, broadcast changes, etc., the user may override the "sorted" mode to reorder the stories. The "sorted" mode is overridden by selecting the "Order" command from the menu bar 38. Selecting the "Order" command puts the queue into an "order" mode. This enables the user to select and move stories within the queue using conventional drag and drop methodology. Once a story is selected, it may be dragged to a different insertion point in the queue. If the dragging extends above or below the top or bottom edge of the queue panel 34, scrolling occurs, enabling the user to access insertion points beyond the display of the queue panel 34. When a story is moved within the queue, the backtime field is updated to compensate for the change in the order of different length stories. Furthermore, the field names may be changed and new fields may be added or existing ones removed. The alignment of text within fields may be varied and the display size of fields may be changed.

The entries in the queue panel 34 can be navigated using either the mouse of the cursor keys. The following table describes the action of the navigation keys within the Queue Panel:

| KEY SEQUENCE | FUNCTION |
| --- | --- |
| HOME | Moves to first column of entry |
| CNTL+HOME | Moves to top of queue |
| END | Moves to last column of entry |
| CNTL+END | Moves to end of queue |
| PAGE UP | Scrolls display up one screen |
| CNTL+PAGE UP | Changes selected entry to top entry of current display |
| PAGE DOWN | Scrolls display down one screen |
| CNTL+PAGE DOWN | Changes selected entry to bottom entry of current display |
| UP ARROW | Moves selected entry up by one |
| DOWN ARROW | Moves selected entry down by one |
| CNTL+UP ARROW | Moves to top of queue |
| CNTL+DOWN ARROW | Moves to end of queue |
| ALT+LEFT ARROW | Focus changes to the directory panel 32 |
| ALT+RIGHT ARROW | Opens the selected story for reading or editing depending on the queue traits and changes focus to the story panel 36. This happens whether or not the selected entry is visible on the screen. |

Stories or fields shown in the queue panel may be color coded. The color coding may be used to specify the status of a story or the urgency of a wire. For example, stories which were opened and viewed within a particular time frame may be shown in one color. Unviewed stories are shown in another color. If a story has been altered since the user read it, it reverts back to the unviewed story color. This distinction lasts for a length of time specified by the user, and is stored in the database. Stories which have been displayed for a predetermined amount of time in the story panel 36 are considered to have been viewed and therefore changed to the viewed story color. If stories are open for the predetermined time but unedited, the text will still change color to the viewed story color.

In order to limit access to various portions of the available stories, usage within queue panel 34 may be restricted to users with write permission on the queue. Users with write privileges may directly edit story fields without having to open the story. This is done by selecting the "Edit" option in the pulldown menu bar 38 and selecting the "Replace" mode. The user may also be able to select the replace mode by clicking on a button in tool bar 40. Selecting the Replace mode enables the user to edit the story displayed in the story panel 36 or to edit the different fields shown in the queue panel 34. Selecting the Replace mode from the pulldown menu or the tool bar when in the Replace mode causes the system to exit the Replace mode. Once the desired edits have been made in the selected story in the queue panel 34, the edits may be saved by selecting the save option from the pulldown menu 38 or by clicking on the "Save" icon in tool bar 40. Saving the contents of the Replace window automatically changes the focus back to the queue panel 34. The user may then select another story to edit, using the mouse or the keyboard. When another story has been selected, the focus is switched back to a Replace window and the story information is downloaded to the Replace window for editing. Pressing function key 7 (F7) while the focus is on the Replace window automatically selects and downloads the template of the next story in queue panel 34. If the contents of the "Replace" Window have been modified, the template will be saved before downloading the next story.

In the example shown in FIG. 2, queues with a name of RUNDOWN are queues which include a listing of the order of the stories for a particular broadcast. Rundown queues may include a field entitled "Backtime." Backtime is based on calculation backwards from a specified point in the broadcast, such as the end of the broadcast. Optionally, a cumulative time from the beginning of the broadcast may also be displayed. Backtimes and cumulative times are used to determine if the stories planned for a broadcast "fit" within the start and end times of the broadcast and within the breaks during the broadcast. Stories in the queue which do not fit are highlighted, and their elapsed times may be adjusted to make the story fit. The story also may be "floated", which means that the story is temporarily removed from the broadcast. The floated story then is either highlighted in the queue in a color which indicates that it is floating, or the story is moved within the queue to a point in the rundown after the end of the broadcast.

In addition to the back timing, cumulative timing and story segment timing discussed above, is also possible to display a block time of a selected group of stories. A block may be selected by left-clicking the pointing device on a story and "dragging" the pointing device to highlight the desired stories. This enables the user to select a block of stories within the queue and determine the cumulative time for that block. The cumulative time temporarily is displayed within the queue panel each time the selection is changed.

The tool bar 40, shown in FIG. 2, is an example of a typical tool bar which may be used with the present invention. However, the tool bar 40 may be customized by the user to include tools which are more frequently used by the particular user.

The main window 30 also includes an active status bar 41 which enables the user to quickly determine the different modes that the queue panel may be in at any given time. The status bar contains standard mail and message regions as well as additional regions. In a first region, "refresh" is displayed if the refresh mode is set on the queue being displayed. "Versions" is displayed if the "wire browsing" mode of the queue panel 34, shown in FIG. 7A, is being displayed. In region 2, "on-air" is displayed if the queue being displayed is currently in the on-air or director mode shown in FIG. 7C. "Backtime" is displayed in region 2 if the queue is currently being backtimed, and "order" is displayed in region 2 if the queue is currently being ordered. In region 3, "sorted" is displayed if the queue being displayed is a sorted queue which has not been ordered and "ordered" is displayed in region 3 if the queue is a sorted queue which has been ordered. In region 4 "read only" is displayed if the queue being displayed is a read-only template. When the user is performing a replace operation, "replace" will be displayed in region 4. If none of the status modes for a given region apply to the queue, the region is left blank.

The status bar 41 also includes a bulletin area in which the title of the last wire bulletin that has been received by the computer network is displayed. Clicking on this area with a pointing device automatically opens a queue containing wire bulletins in the queue panel 34, so that the user may view the incoming bulletins. This area of the status bar 41 blinks and a notification tone is sounded to alert the user that a new bulletin has been received. When the title of a bulletin is displayed in the status bar 41, the bulletin area is highlighted in a color which indicates one of a number of levels of urgency of the bulletin.

Story Panel

The story panel 36 is used to view and edit stories opened in the queue panel 34. It may be used to display wire stories as well as stories input by users. The story panel 36 also may be displayed in several different layouts, depending on how much information about the story the user needs to view. Three display options for the story panel 36 are shown in FIGS. 8A–8C.

Figure 8A:
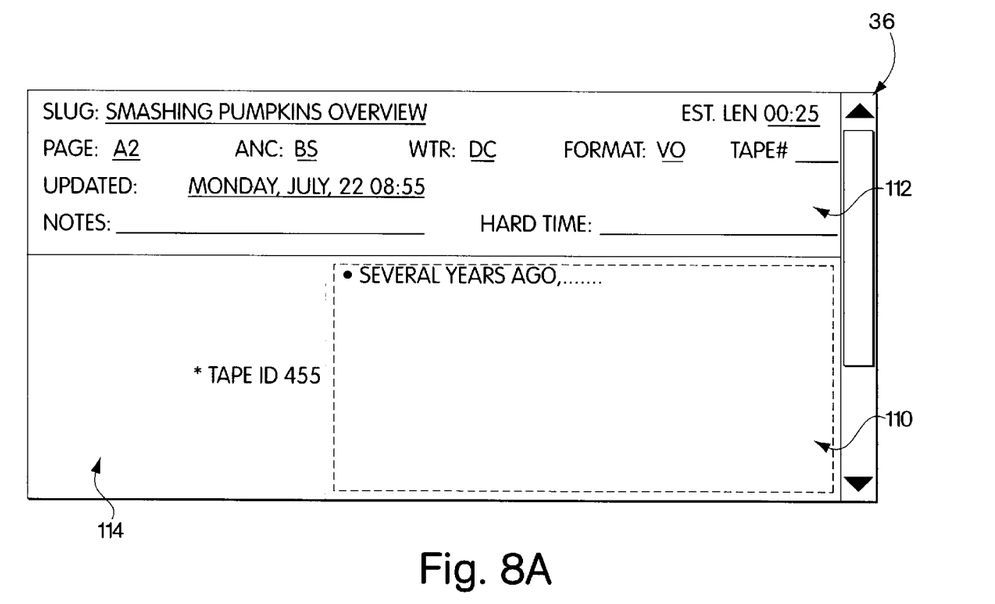
FIG. 8A shows a script mode of the story panel of the main application window of the graphical use interface of FIG. 2.
Figure 8B:
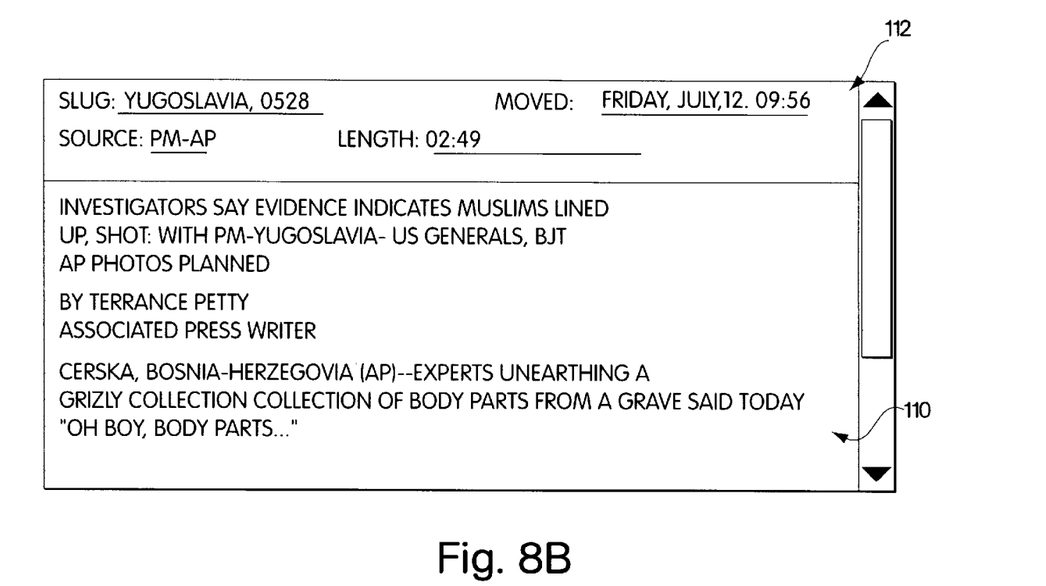
FIG. 8B shows a non-script mode of the story panel main application window of the graphical user interface of FIG. 2.
Figure 8C:
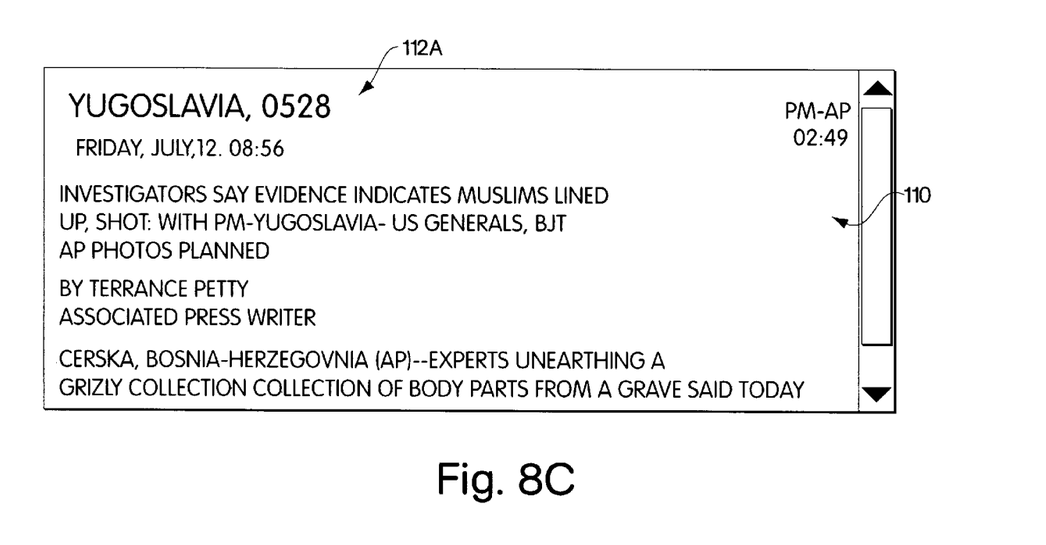
FIG. 8C shows a template-embedded mode of the story panel main application window of the graphical user interface of FIG. 2.

A script mode of the story panel 36 is shown in FIG. 8A. In the script mode, the story panel 36 includes a story area 110, a template area 112 and a machine code area 114. The story area 110 is the area where the text of a story opened in queue panel 34 is displayed. In the script mode, i.e., when the story has machine code associated with it, such as is shown in FIG. 8A, the story area 110 contains the text that is to be displayed on a teleprompter to be read by an anchor person. The text displayed in story area 110 may be edited in the same way as conventional windows editing is done. The template area 112 displays the story information which is included in the queue panel 34. The machine code area 114 displays machine codes which are inserted into the story at points in the story where control of machines such as teleprompters and video playback devices is desired. The use of machine codes is discussed in more detail below. Each of story area 110, template area 112 and machine code area 114 has an associated object menu which may be invoked by moving the cursor to the desired area and clicking the right mouse button. The commands included in each object menu for each area are described below.

| The Story Area Object Menu includes the following commands: | |
|---|---|
| Cut | Cuts the selection |
| Copy | Copies the selection |
| Paste | Pastes the clipboard at the insertion point (if there is currently a selection, it will replace the selection with the clipboard contents) |
| Insert Code | Places an insertion point for a machine code at the location of the cursor |
| Script | Shows/Hides the machine code area |
| Zoom | Switches the story panel between workspace and zoom mode. (If the window is in zoom mode, this menu item is checked) |

| The Machine Code Area Object Menu includes the following commands: | |
|---|---|
| Cut | Cuts the selection |
| Copy | Copies the selection |
| Paste | Pastes the clipboard at the insertion point (if there is currently a selection, it will replace the selection with the clipboard contents) |
| Insert Code | Places an insertion point for a machine code at the location of the cursor |
| Script | Shows/Hides the machine code area |
| Zoom | Switches the story panel between workspace and drill down mode. (If the window is in zoom mode, this menu item is checked) |

| The Template Area Object Menu includes the following commands: | |
|---|---|
| Cut | Cuts the selection |
| Copy | Copies the selection |

| -continued | |
|---|---|
| Paste | Paste the clipboard at the insertion point (if there is currently a selection, it will replace the selection with the clipboard contents) |
| Zoom | Switches the story panel between workspace and zoom mode. (If the window is in zoom mode, this menu item is checked). |

As shown in FIG. 8B, in the non-scripted mode, the story panel 36 may include only the story area 110 and the template area 112. This form is used when there is no machine code associated with the story, and the machine code area 114 therefore does need to be displayed. The story panel 36 may also be configured in a template-embedded mode, as shown in FIG. 8C, where only the story area 110 is shown, with the template information 112A embedded within the story area 110.

When the story panel 36 is configured in the script view as shown in FIG. 8A, the machine code area 114 is opened. The machine code area 114 is the area where machine codes which control machines such as video playback machines and teleprompters, etc., are manipulated. Each code is stored in a machine code object which contains all the text for the machine code and a corresponding insertion point which is visible in a text of the story area 110. This insertion point indicates at what point in the text the results of the machine code should occur.

The story panel 110 can be operated in an automatic scripting mode in which case the machine code area 114 is automatically shown or hidden depending on whether the currently viewed story has associated machine codes. The machine code area 114 can also be used for notes and annotations which the user can insert, without invoking any machine code commands.

Machine codes may be inserted into the machine code area 114 either from story area 110 or from the machine code area 114. To insert machine code from the story area 110 of the story panel 36, the cursor is positioned to the location where the machine code command is to be carried out and the "insert code" command is selected from the object menu. This creates an insertion point in the story area and moves the cursor to the machine code area where the user may type in desired code. Alternatively, the user may position the cursor where the machine code is to be entered and press the "Alt" key while clicking the left mouse button.

Machine codes can be placed on the clipboard by selecting the machine code or the code's insertion point and performing the "cut" or "copy" command. Once code is on the clipboard it may be pasted anywhere within the machine code area 114. An insertion point may also be dragged within the story area 110 using the mouse, and the corresponding machine code in machine code area 114 is automatically repositioned to where the insertion point is moved within story area 110. If there are several machine codes for the same story, the machine codes will be played in the same order as they are inserted into the story.

The machine code is anchored to the particular insertion point in the text. This means that if the text which includes the insertion point is moved to a different location within story area 110, such as during a "cut and paste" operation, the associated machine code is moved to correspond with the movement of the text. In the news story markup language patent application incorporated by reference above, this anchoring procedure is described in detail. Briefly stated, corresponding "identifying tags" are attached to the machine codes and to the corresponding insertion point in the text of the story displayed in the story area 110. When the insertion point is moved within the text of the story, the anchored machine code, having a identifying by corresponding to the insertion point, is moved along with the moved insertion point. This allows the user to edit stories in the story area without having to keep track of the machine code which is inserted within the text.

When the story panel 36 is in focus, the menu bar for the story panel 36 is displayed in the menu bar 38 of the main application window 30. The story panel menu has the following pull-down commands:

| Template | |
|---|---|
| None | Hides the template area |
| Embedded | Shows the template embedded in the story area |
| Script | Shows/hides the machine code area |
| AutoScript | Toggles AutoScript mode |
| Insert Code | Inserts a machine code insertion point at the cursor position of the story area and moves the cursor to the corresponding machine code object edit area |
| Next | Shows next story in the queue |
| Previous | Shows previous story in the queue |
| First | Shows first story in the queue |
| Last | Shows last story in the queue |

Navigation within the story panel 36 can be accomplished using the following keyboard interactions:

| | |
|---|---|
| Alt + Left Arrow | Moves focus to the queue panel 34 |
| Alt + Right Arrow | From story area 110: moves focus to machine code area 114(if shown); from the template area 112 and machine code area 114: moves focus to story area 110. |
| Alt + Up Arrow | From story area 110: moves focus to template area 112, if it is shown; otherwise - machine code area 114, if it is shown; from machine code area 114: moves focus to template area 112, if shown; from template area 112: moves focus to queue panel 34. |
| Alt + Down Arrow | From story area 110: moves focus to machine code area 114, if shown; from machine code area 114: moves focus to story area 110; from template area 112: moves focus to machine code area 114 if it is shown; otherwise - to story area 110; |
| Alt + Page Up | Browse to the next story in the queue. |
| Alt + Page Dn | Browse to the previous story in the queue. |
| Alt + Home | Browse to the first story in the queue. |
| Alt + End | Browse to the last story in the queue. |

The main application window 30 may also display special timing clocks 100, 102, 104, and 106 in the tool bar area 40. The "Station" clock 100 displays a station clock which indicates the real time during the broadcast. The "Item" clock 102 displays a countdown time of the current story being broadcast. The Hand Out clock 104 displays a countdown time to the next hard out time in the broadcast, and the "Over/Under" clock 106 indicates a cumulative over/under time for the entire broadcast during the selected story. During the broadcast, it is possible to synchronize these timing clocks with a story being broadcast. When the story begins, a synchronize command is selected from the pull-down menu 38 in order to synchronize the clocks 100, 102, 104 and 106 with the beginning of the particular story being broadcast. This enables the user to track the timing of the broadcast from the particular story.

News story information is generally shared by a number of different users with different information requirements. Journalists, producers, directors, and announcers share news story information. In addition, news story information typically must be available on a wide variety of distribution means, such as video playback devices and teleprompters. The graphical user interface of the present invention allows quick and easy access to the hundreds of news storied that are received daily in a typical newsroom. The stories can be entered, viewed and edited, and news broadcasts can be produced. The present invention enables users to insert machine code within the text of the news story to control video playback devices and teleprompter during broadcasts.

Having now described several embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A newsroom computer graphical user interface for viewing and editing news stories, comprising:

means for displaying at least one workspace in a main application window on a display screen of a computer system, the computer system being coupled to a network and having a processor, the display screen being coupled to the processor;

means for storing a plurality of news stories in a plurality of files;

means for delivering selected visual representations of the files from the means for storing to the display screen under control of the processor;

means for receiving user edits; and user-controlled input means for controlling the means for storing, the means for delivering, and the means for receiving;

wherein said at least one workspace comprises a plurality of non-overlapping, cooperating, graphically adjustable panels, a first of said panels displaying a queue of said news stories of a selected one of the files, and a second of said panels displaying text of a news story selected in said first panel for viewing capable for editing by a user according to the received user edits.

2. The computer graphical user interface of claim 1, wherein said plurality of panels share a common moveable border.

3. The computer graphical user interface of claim 2, wherein the display screen displays the workspace with a third panel which displays a directory tree of said files.

4. The computer graphical user interface of claim 1, wherein the display screen displays the workspace with said first panel comprising a plurality of rows, each containing information about each of said plurality of news stories.

5. The computer graphical user interface of claim 4 wherein the display screen displays the workspace with said first panel further comprising a plurality of columns, each containing a different field of said information about each news story.

6. The computer graphical user interface of claim 3, wherein the display screen displays the workspace with said second panel comprising at least one sub-panel capable of being equal to or less than a display area of the second panel.

7. The computer graphical user interface of claim 6 wherein the display screen displays the workspace with a first of said at least one sub-panel displaying text of said selected news story.

8. The computer graphical user interface of claim 7, wherein the display screen displays the workspace with a second of said at least one sub-panel displaying information about said selected news story.

9. The computer graphical user interface of claim 8, wherein the display screen displays the workspace with a third of said at least one sub-panel displaying machine code for manipulating machines during a broadcast.

10. The computer graphical user interface of claim 9, wherein the display screen displays the workspace with said third of said at least one sub-panel displaying machine code for manipulating video playback devices.

11. The computer graphical user interface of claim 9, wherein said machine code is anchored to a point in said text of said first sub-panel, said point being a location in said text where said machines are controlled in response to said machine code.

12. The computer graphical user interface of claim 9, wherein the user edits include any one or more edits of the group of edits comprising inserting one or more machine codes, moving one or more machine codes, or deleting one or more machine codes.

13. The computer graphical user interface of claim 3, wherein said at least one workspace is capable of toggling between displaying all of said first, second and third panels and displaying one of said first, second and third panels.

14. The computer graphical user interface of claim 1, wherein the display screen displays the workspace with said main application window comprising a tool bar.

15. The computer graphical user interface of claim 14, wherein the display screen displays the workspace with said tool bar comprising a means for sending messages to and receiving messages from other users on said network.

16. The computer graphical user interface of claim 1, wherein said plurality of panels of said at least one workspace are automatically arranged to fit within said workspace without overlapping.

17. The computer graphical user interface of claim 1, wherein the queue includes an identifier and timing information for each news story.

18. The computer graphical user interface of claim 17, wherein the timing information for one or more news stories includes any one or more of the group consisting of: a run time of one or more stories, a length of time of reading of a text associated with a story, a total time of a story, a cumulative elapsed time of a broadcast of one or more stories, or a backtime calculated backwards from a point in the broadcast.

19. The computer graphical user interface of claim 18, wherein the user edits include an edit to change the order of one or more stories, and the elapsed time of the broadcast is automatically changed to correspond to the change in the order of the one or more stories.

20. The computer graphical user interface of claim 18, wherein the user edits include one or more edits to change any one or more timing information.

21. The computer graphical user interface of claim 1, wherein the queue includes an identifier and timing information for one or more breaks.

22. The computer graphical user interface of claim 1, wherein the news, stories are sorted based on an order in which they are to be broadcast.

23. The computer graphical user interface of claim 22, wherein the user edits include an edit to change the order of one or more stories.

24. The computer graphical user interface of claim 1, wherein the news stories are sorted based on an order in which they have been broadcast.

25. The computer graphical user interface of claim 24, wherein the user edits include an edit to change the order of one or more stories.

26. The computer graphical user interface of claim 1, wherein the queue further includes, for each news story, an indicator for any one or more of the group consisting of: a location of the news story within a broadcast, a presenter of the story, a writer of the story, a title of the story, an approval status of the story, a format of the story, a video tape associated with the story, a ready status of a story, a date on which a story was updated, a person who updated a story, or notes regarding a story.

27. The computer graphical user interface of claim 26, wherein the user edits include one or more edits to change any one or more indicator.

28. The computer graphical user interface of claim 1, wherein the user edits include an edit to change the text of a news story.

29. A computer implemented method for use in a newsroom, comprising:
    displaying at least one workspace window on a display screen of a computer system, the computer system being coupled to a network and including a processor, the display screen being coupled to the processor;
    storing files, each containing a plurality of news stories;
    delivering visual representations of said files from said storing means to said display screen;
    receiving a first input signal from the input means, which indicates a selection of one of said files;
    displaying, in a first graphically adjustable panel of said workspace window, a queue of said plurality of news stories contained in said selected file in response to the step of receiving said first input signal;
    receiving a second input signal from the input means, which indicates a selection of one of said plurality of stories contained in said selected file;
    displaying, in a second graphically adjustable panel of said workspace window, text of said selected story in response to the step of receiving said second input signal; and
    receiving a third input signal from the input means, which indicate user edits of the text in the second panel or the queue in the first panel;
    wherein said first and second panels are non-overlapping.

30. The method of claim 29, further comprising a step of displaying, in a third panel of said workspace, a directory tree of said files.

31. The method of claim 30, further comprising a step of displaying, in said first panel, information about the selected story, in response to the step of receiving said first input signal.

32. The method of claim 31, further comprising a step of receiving a fourth input signal from the input means, which comprises machine code for manipulating machines during a broadcast, and in response to said fourth input signal, displaying said machine code in said third panel.

33. The method of claim 32, further comprising a step of anchoring said machine code to a location within said text of said selected story.

34. The method of claim 30, further comprising a step of displaying a tool bar in said workspace.

35. The method of claim 34, wherein said tool bar includes a means for sending messages to other users on said network.

36. The method of claim 33, further comprising a step of displaying a plurality of workspaces on said display screen.

37. The method of claim 36 wherein, in said displaying a plurality of workspaces step, said plurality of workspaces are displayed in a non-overlapping, cooperating relationship with each other.

38. The method of claim 36, wherein, in said displaying a plurality of workspaces step, said plurality of workspaces are displayed in an overlapping relationship with each other.

39. The method of claim 33, wherein, if said location of said text is moved within said story, said anchored machine code is also moved to correspond with the movement of said location.

40. The method of claim 33, further comprising a step of toggling between displaying all of said panels in said workspace and displaying only one of said panels in said workspace.

41. The method of claim 29, further comprising the step of automatically arranging said panels to fit within said workspace window without overlapping.

42. A newsroom computer graphical user interface comprising:
   means for displaying at least one workspace in a main application window on a display screen of a computer system, the computer system being coupled to a network and having a processor, the display screen being coupled to the processor;
      means for storing a plurality of news stories in a plurality of files;
      means for delivering selected visual representations of the files from the means for storing to the display screen under control of the processor; and
      user-controlled input means for controlling the means for storing and the means for delivering;
      wherein said at least one workspace comprises a plurality of non-overlapping, cooperating, graphically adjustable panels, a first of said panels displaying a queue of said news stories of a selected one of the files, and a second of said panels displaying text of a news story selected in said first panel;
      wherein said plurality of panels share a common moveable border; and
      wherein the display screen displays the workspace with a third panel which displays a directory tree of said files, with said second panel comprising at least one sub-panel, with a first of said at least one sub-panel displaying text of said selected news story, with a second of said at least one sub-panel displaying said information about said selected news story, and with a third of said at least one sub-panel displaying machine code for manipulating machines during a broadcast, wherein said machine code is anchored to a point in said text of said first sub-panel, said point being a location in said text where said machines are controlled in response to said machine code.

43. A computer implemented method for use in a newsroom, comprising:
   displaying at least one workspace window on a display screen of a computer system, the computer system being coupled to a network and including a processor, the display screen being coupled to the processor;
   storing files, each containing a plurality of news stories;
   delivering visual representations of said files from said storing means to said display screen;
   receiving a first input signal from the input means, which indicates a selection of one of said files;
   displaying, in a first graphically adjustable panel of said workspace window, a queue of said plurality of news stories contained in said selected file in response to the step of receiving said first input signal;
   receiving a second input signal from the input means, which indicates a selection of one of said plurality of stories contained in said selected file;
   displaying, in a second graphically adjustable panel of said workspace window, text of said selected story in response to the step of receiving said second input signal;
   displaying, in a third panel of said workspace, a directory tree of said files;
   displaying, in said first panel, information about the selected story, in response to the step of receiving said first input signal;
   receiving a third input signal from the input means, which comprises machine code for manipulating machines during a broadcast, and in response to said third input signal, displaying said machine code in said third panel; and
   anchoring said machine code to a location within said text of said selected story;
   wherein said first and second panels are non-overlapping.

44. The method of claim 43, further comprising a step of displaying a plurality of workspaces on said display screen.

45. The method of claim 44 wherein, in said displaying a plurality of workspaces step, said plurality of workspaces are displayed in a non-overlapping, cooperating relationship with each other.

46. The method of claim 44, wherein, in said displaying a plurality of workspaces step, said plurality of workspaces are displayed in an overlapping relationship with each other.

47. The method of claim 43, wherein, if said location of said text is moved within said story, said anchored machine code is also moved to correspond with the movement of said location.

48. The method of claim 43, further comprising a step of toggling between displaying all of said panels in said workspace and displaying only one of said panels in said workspace.

* * * * *